United States Patent [19]

Yoshio

[11] Patent Number: 4,996,679
[45] Date of Patent: Feb. 26, 1991

[54] SUBCODE INFORMATION AND BLOCK IDENTIFICATION SYSTEM FOR A DISC PLAYER

[75] Inventor: Junichi Yoshio, Tokorozawa, Japan

[73] Assignee: Pioneer Electronic Corporation, Tokyo, Japan

[21] Appl. No.: 379,647

[22] Filed: Jul. 14, 1989

[30] Foreign Application Priority Data

Jan. 30, 1989 [JP] Japan .................................... 1-21000

[51] Int. Cl.$^5$ ............................................. G11B 27/10
[52] U.S. Cl. ....................................... 369/33; 369/32; 369/47; 369/41; 369/43
[58] Field of Search ................... 369/32, 33, 44.11, 47, 369/58, 59, 60, 43, 34, 124, 86, 41

[56] References Cited

U.S. PATENT DOCUMENTS

| | | | |
|---|---|---|---|
| 4,426,692 | 1/1984 | Hirata | 369/32 |
| 4,550,393 | 10/1985 | Sugiyama et al. | 369/33 |
| 4,697,256 | 9/1987 | Shinkai | 369/33 |
| 4,716,558 | 12/1987 | Katayama et al. | 369/43 |
| 4,719,611 | 1/1988 | Miura et al. | 369/47 |
| 4,800,549 | 1/1989 | Yamagami et al. | 369/59 |
| 4,893,293 | 1/1990 | Endo et al. | 369/34 |

Primary Examiner—William M. Shoop, Jr.
Assistant Examiner—John W. Cabeca
Attorney, Agent, or Firm—Foley & Lardner, Schwartz, Jeffery, Schwaab, Mack, Blumenthal & Evans

[57] ABSTRACT

An apparatus for playing a disc on which, in addition to a coded information signal, a digital information signal divided into blocks is recorded as a subcode together with a block identification signal for identifying the blocks, comprises a reading device for reading the coded information signal and the subcode from the disc, a decoder for decoding the subcode to produce an information signal, a repeater for repeating the subcode read out by the reading device to the decoder in response to a repeat command, and a controller for controlling the reading device and the repeater. The controller issues, in response to a command, a jump command for moving an information reading point of the reading device across M (M is a natural number) tracks in a direction retracing a reading direction every time a predetermined time period corresponding to the relative position of the information reading point in a radial direction of the disc elapses; detects, during a period between issuing of the jump command and issuing of the next jump command, an N-block period, in which N (N is a natural number) blocks of the subcode are read, by a block identification signal obtained from an output signal of the reading device; and supplies the repeating command to the repeater only during the N-block period.

3 Claims, 4 Drawing Sheets

4,996,679

SUBCODE INFORMATION AND BLOCK IDENTIFICATION SYSTEM FOR A DISC PLAYER

BACKGROUND OF THE INVENTION

1. Field of the Invention

The present invention relates to a disc playing apparatus for playing a disc on which a digital information signal divided into blocks is recorded as a subcode together with a block identification code for identifying the blocks, in addition to a coded information signal such as a digital audio signal.

2. Description of Background Information

A subcode carrying play control information for example is recorded on recording discs such as the digital audio disc designated as CD (compact disc), the disc designated as CD-V having an area in which only digital audio signal is recorded and an area in which a video signal is recorded in addition to the digital audio signal, and the video disc designated as LDD on which digital audio signal of CD format is recorded by a frequency multiplex process. The subcode is constituted by channels P, Q, R, S, T, U, V, and W in which channels P and Q are used as the control signal of the disc player. Specifically, the P channel bits of the subcode are used for distinguishing intervals between two music selections from areas in a music selection. A value 0 is set to the P channel of the subcode for the area in a music selection and a value 1 is set for the interval between two music selections. The Q channel bits are used to indicate the number of the music selection being played, and the time information such as the minutes, seconds, and the frame number which are measured from the head position of the first one of the recorded music programs. The bits indicating the minutes, seconds and the frame number from the head position of the first music program are utilized as a block identification code for identifying each of the blocks designated a subcoding frame.

The channels R through W are vacant channels designated as user's bit, and various types of utilization of these channels such as the recording of picture images are being considered. A standard of the recording format for recording picture images has been already proposed.

On the other hand, a standard called MIDI (Musical Instrument Digital Interface) has been developed so as to enable a music performance using a plurality of sound sources by combining a plurality of electronic musical instruments such as a music synthesizer or an electronic piano. A term "MIDI apparatus" is used for designating an electronic musical instrument which includes a hardware according to MIDI standard and has a function to transmit and receive a data format signal (referred to as MIDI signal hereinafter) as a musical instrument control signal of a defined form carrying musical information.

The MIDI signal is a serial data having a transfer rate of 31.25 Kbaud, and one byte data is constituted by 10 bits including 8-bit data and start and stop bits respectively having one bit.

In order to designate the sort of the transmitted data and the MIDI channel, at least one status byte and one or two data bytes leaded by the status byte are combined, forming a message as the music information.

Thus, one message is constituted by 1 through 3 bytes, and the transfer period of 320 through 960$\mu$ sec is required for its transfer.

As an example of such a message, the structure of the note-on message is shown in FIG. 8.

The note-on message in the status byte is a command corresponding to an operation of pressing a key of the keyboard, and used in a pair together with a note-off message which corresponds to an operation of releasing the key of the keyboard. The "note-number" in the data byte #1 is used to designate one of 128 stages which are allotted to the keys of the keyboard with its center positioned on the "central do" of the musical scale provided by the sound source. The "velocity" in data byte #2 is a number corresponding to the velocity of operation of the keyboard, and indicates the strength of the sound to be generated. Upon receipt of the note-on message, the MIDI apparatus generates a note of the designated musical scale at the designated strength, and stops the generation of the note when it receives the note-off message.

Not only the picture information, the MIDI signal can also be recorded in the user's bit of the subcode. By recording picture information and the MIDI signal in the user's bit, in addition to the reproduction of pictures and sounds obtained by the audio and video signals reproduced by the disc player, it is possible to control one or more additionally provided MIDI apparatuses in a predetermined order. Therefore, various possibility of the utilization of this arrangement, such as the construction of an audio visual system including electronic musical instruments and capable of a program reproduction with full of presence, or the application to the production of educational softwares, are being considered.

An example of the construction of data format with the channels R through W of the subcode, i.e., the user's bits is shown in FIG. 9. As shown in this figure, one symbol is formed of six bits belonging to the channels R through W respectively. Ninety-eight symbols are treated as one block. Among these 98 symbols, 2 symbols are used as the synchronizing signal for subcoding frames, and 24 symbols obtained by dividing the remaining 96 symbols by 4 are treated as a minimum unit of the data, i.e. a Pack, and an image processing instruction or a MIDI signal group is constituted by this minimum data unit.

The symbol 0, i.e., the first one of the 24 symbols, represents the Mode. For instance, if the symbol 0 is "001001", it represents the TV graphics mode. On the other hand, if it is "111111" it indicates the MIDI mode. The symbol 1 following the symbol 0 is the "Instruction" indicating the sort of the instruction in the case of the picture processing instruction. The symbols 3 and 4 form the parity Q operating as an error correction code. The symbols from the symbol 4 through the symbol 19 form a data field, which carries the color information or the MIDI signal.

As mentioned above, the picture information or the like is recorded on a disc in addition to the digital audio signal by using the user's bits of the subcode. Conventional disc players for playing such a disc have been configured to successively play the information recorded by the user's bit of the subcode in accordance with the progress of the play of the digital audio signal.

However, there are cases where it is desired to perform the so-called slow reproduction operation in which the speed of the play of the information recorded by the use's bit of the subcode becomes slower than its speed during the play of the digital audio signal. With the conventional player, it has been necessary to appropriately command a temporary interruption of the playing operation that is the so called pausing by a manual operation, in order to perform the slow reproduction operation. Thus, when it is attempted to perform a slow reproduction operation with the conventional players, there have been problems such that the complicated operation is required, and that there can be a frame whose information is only partially supplied to the decoder, since the number of the subcode frames recorded in one circumferential track portion varies from 9.5 to 21. Therefore, the slow reproduction operation could not be performed satisfactorily with conventional disc players.

OBJECT AND SUMMARY OF THE INVENTION

An object of the present invention is to provide a disc playing apparatus which is capable of performing the slow reproduction of the subcode information automatically and satisfactorily.

According to the present invention, the disc playing apparatus is provided with a repeating means for repeating the subcode which has been read by the reading means to a decoding means in response to a repeating command. Every time a predetermined time period corresponding to the relative position of the information reading point of the reading means in a radial direction of the disc elapses, the playing apparatus issues a jump command for moving the information reading point across M (M is a natural number) tracks in a direction retracing the reading direction. During a time period between issuing of the jump command and issuing of the next jump command, the playing apparatus detects an N-block period in which N (N is a natural number) blocks of the subcode are read out by means of a block identification signal obtained from the output signal of the reading means, and the playing apparatus supplies a repeating command to the repeating means only during the N-block period.

DETAILED DESCRIPTION OF THE PREFERRED EMBODIMENT

The embodiment of the present invention will be explained in detail with reference to FIGS. 1 through 7 of the accompanying drawings.

Figure 1:
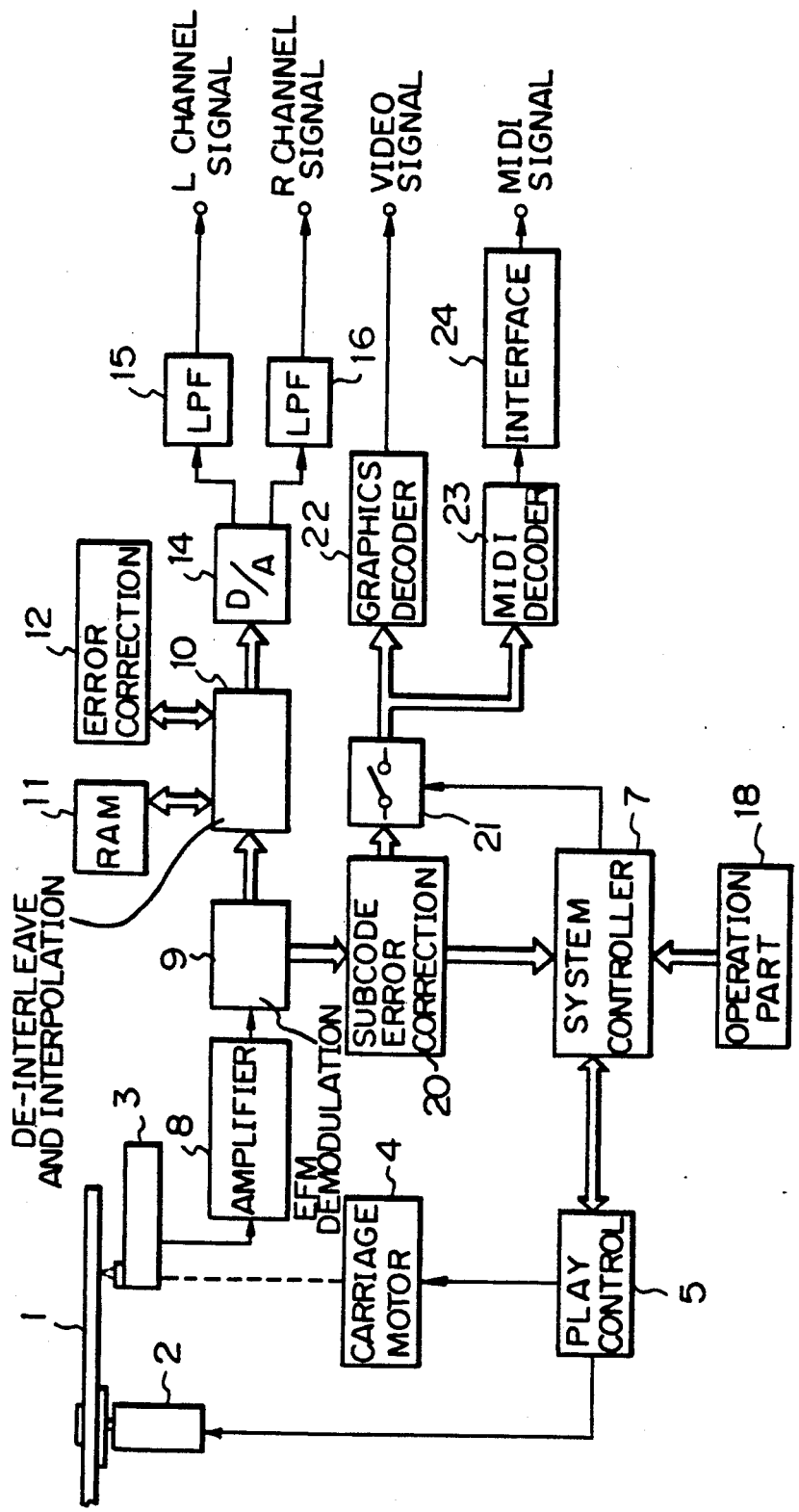
FIG. 1 is a block diagram showing an embodiment of the present invention.

In FIG. 1, a disc 1 on which a plurality of music selections are recorded is rotated by a spindle motor 2. With the rotation of the disc 1, a signal recorded on the disc is read by a pickup 3. The pickup 3 is carried on a carriage (not shown) which is driven by a carriage motor 4 and movable in a radial direction of the disc 1. With this arrangement, the position of an information reading point (information reading light spot) of the pickup 3 is arbitrarily determined in the radial direction of the disc 1. Furthermore, the player is provided with various servo systems such as the spindle servo system, focus servo system, tracking servo system, and carriage servo system. Since these servo systems themselves are well known, the explanation thereof is not given in the specification.

The spindle motor 2 and the carriage motor 4 are respectively driven by the spindle servo system and the carriage servo system, or directly driven by a playing part control circuit 5. In response to commands from the system controller 7, the playing part control circuit 5 performs various operations such as the drive of the spindle motor 2 and the carriage motor 4, and the on-off control of the servo systems mentioned above, and the jump control.

The RF (radio frequency) signal output from the pickup 3 is amplified by an RF amplifier 8 and supplied to an EFM demodulation circuit 9. The EFM (eight-to-fourteen modulation) demodulation circuit 9 is configured to perform an EFM modulation of a pulse signal obtained by slicing the RF signal, to produce PCM data, i.e., digital audio data including audio information of the left and right channels multiplexed by the time division multiplex system, and the subcode. The digital data including audio information, output from this EFM demodulation circuit 9 is supplied to a de-interleave and interpolation circuit 10. The interleave and interpolation circuit 10 is configured to perform the following operations. In cooperation with RAM 11, the de-interleave and interpolation circuit 10 puts the digital data in it original order, whose order has been changed by the interleave operation at the time of recording. The de-interleave and interpolation circuit 10 then transmits the digital data to an error correction circuit 12, and performs the interpolation of erroneous data in the output data of the error correction circuit 12, by using the average value interpolation method for example, when a signal indicating the impossibility of the correction is issued from the error correction circuit 12. The error correction circuit 12 is configured to perform an error correction operation using the CIRC (Cross Interleave Reed Solomon Code) and to supply the digital data to deinterleave and interpolation circuit 10, and to generate the signal indicating the impossibility of the correction if the correction of error is not possible.

The output data of the de-interleave and error correction circuit 10 is supplied to a D/A (digital to analog) converting circuit 14. The D/A converting circuit 14 includes a de-multiplexer for separating the audio information of the left and right channels which has been multiplexed by the time division multiplex system into information of each channel, so that audio signals of the left and right channels are reproduced. The audio signals of the left and right channels are supplied to LPFs (low-pass-filters) 15 and 16 where unnecessary components are removed, and supplied to audio output terminals subsequently.

The subcode output from the EFM demodulation circuit 9, on the other hand, is supplied to a subcode error correction circuit 20 where the error correction of the subcode is performed. The P and Q channels of the subcode are supplied to the system controller 7. The R through W channels of the subcode after passing through the error correction process by the subcode error correction circuit 20 are supplied to the graphics decoder 22 and the MIDI decoder 23 through a switch 21 as the repeating means.

If the symbol 0 of the channels R through W of the subcode indicates that the TV graphics mode, the graphics decoder 22 takes this data and demodulates it into a video signal. The video signal is supplied to a display unit (not shown) through a video output terminal.

If the symbol 0 of the channels R through W of the subcode indicates the MIDI Mode, the MIDI decoder 23 takes the subcode and decodes it into a serial MIDI signal. The decoded MIDI signal is supplied to an interface 24 comprised of a transmitter and a line driver. The MIDI signal is then supplied to an IN terminals of MIDI apparatuses (not shown) through a MIDI OUTPUT terminal.

The system controller 7 is constituted by a microcomputer including a processor, ROM, RAM, and timers. In response to various commands corresponding to key operations supplied from the operation part 18, the system controller 7 executes arithmetic operations on the basis of data or programs stored in ROM, RAM and the like, and subsequently supplies instruction signals for the play, search, jump operation or the like, to the playing part control circuit 5.

Figure 2:
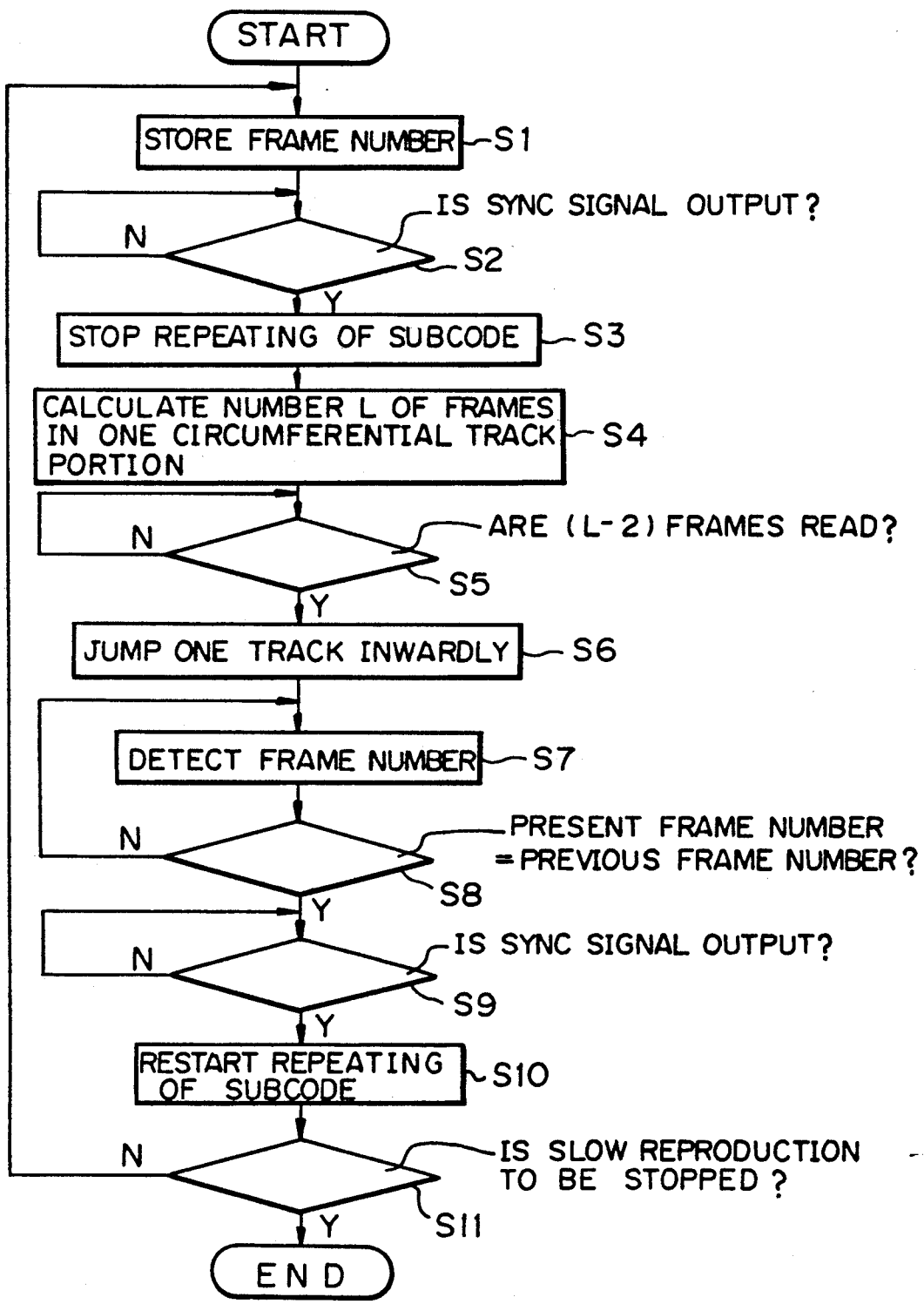
FIG. 2 is flowchart showing the operation of the processor in the apparatus shown in FIG. 1.

The operation of the processor of the system controller 7 in the apparatus having the construction mentioned above will be explained with reference to the flowchart of FIG. 2.

If the manual search command is issued when the operational mode of the player is set to the play mode by the execution of the main routine, play mode control routine and the like, the processor proceeds to step S1 in which the processor detects the frame number of the subcoding frame being read by using the Q channel data, and stores it in a predetermined address of RAM. Here, it is assumed that the switch 21 is turned on by the execution of the main routine, and the like.

After the execution of the operation of step S1, the processor repeatedly judges as to whether or not the sync signal in the subcoding frame has been output (step S2). Only when it is judged that the sync signal in the subcoding frame has been output, the processor stops the transmission of an on-command to the switch 21, so that the subcode will not be repeated to the graphics decoder 21 and the MIDI decoder 23 (step S3).

Subsequently, the processor detects the position of the information reading point of the pickup 3 in a radial direction on the disc 1 using the frame number stored in the predetermined address of RAM, and calculates the number L of frames recorded in one circumferential track portion at the position of the detected radius (step S4). Then the processor judges as to whether or not (L-2) frames have been read out (step S5).

In step S5, if it is judged that (L-2) frames have not been read out, the processor again executes the operation of step S5. Conversely, if it is judged in step S5 that (L-2) frames have been read out, the processor transmits a jump command to the play control circuit 5, so that the information reading point of the pickup 3 jumps to the next track in a direction reverse to the direction of reading, i.e., inwardly (step S6).

After the execution of the step S6, the processor detects the number of subcoding frames being read by using the Q channel data (step S7). Subsequently, the processor judges as to whether or not the detected frame number, i.e., the present value of the frame number coincides with the frame number stored in RAM, i.e., the previous value of the frame number (step S8). If it is detected in step S8 that the previous value of the frame number and the present value of the frame number do not coincide with each other, the processor again proceeds to step S7. If it is detected in step S8 that the previous value and the present value of the frame number are identical with each other, the processor judges as to whether or not the sync signal of the subcoding frame has been output (step S9).

If it is judged in step S9 that the sync signal of the subcoding frame has not been output, the processor again executes the operation step S9. Conversely, if it is judged in step S9 that the sync signal of the subcoding frame has been output, the processor starts transmission of the on-command to the switch 21, so that the subcode is repeated to the graphics decoder 22 and the MIDI decoder 23 (step S10). Then, the processor judges as to whether a command for stopping the slow reproduction operation has been issued (step S11). If it is judged in step S11 that the command for stopping the slow reproduction operation is issued, the processor restarts the execution of the routine which the processor was executing immediately before proceeding to the step S1. If it is judged in step S11 that the command for stopping the slow reproduction operation is not issued, the processor again proceeds to step S1.

By the operations in steps S1 through S3 in the operational sequence described above, the frame number of the subcoding frame, which was being read-out when the slow reproduction operation was commanded, is taken and stored in the predetermined address of RAM, and the switch 21 is turned off when the reading of the subcoding frame having the frame number stored in RAM, so that the subcode is no more repeated to the graphics decoder 22 and the MIDI decoder 23.

Subsequently, through the operation of steps S4 through S6, the information reading point of the pickup 3 jumps outwardly by one track upon the lapse of a time period which is shorter than the time period of one revolution of the disc by a predetermined time period $T_0$.

Since the time period required for the one track jump is normally about 1 millisecond, in order to obtain the Q data of a frame $F_n$ accurately it is desirable that the information reading point is positioned, immediately after the jump operation, at the frame $F_{n-1}$ or $F_{n-2}$ which is more than one frame before the frame $F_n$. For this reason, whether or not frames, whose number is determined by subtracting 2 from the number L of frames recorded in one circumferential track portion, have been read out is judged in step S5 so that the predetermined time period $T_0$ mentioned above becomes greater than a time period obtained by adding 1 millisecond to the time period required for reading one subcoding frame.

By the jump operation executed by the operation of step S6, the information reading point will be located on the frame $F_{n-1}$ or the frame $F_{n-2}$, and the reading will be started from the frame $F_{n-1}$ or the frame $F_{n-2}$ by the execution of the operations of steps S7 through S10. When the frame number expressed by the Q data coincides with 15 the frame number of the frame $F_n$, the switch 21 as the repeating means is turned on by the frame sync signal obtained immediately after the coincidence, so that the subcode is repeated to the graphics decoder 22 and the MIDI decoder 23, and the subcode of the frame $F_{n+1}$ will be decoded.

Figure 3:
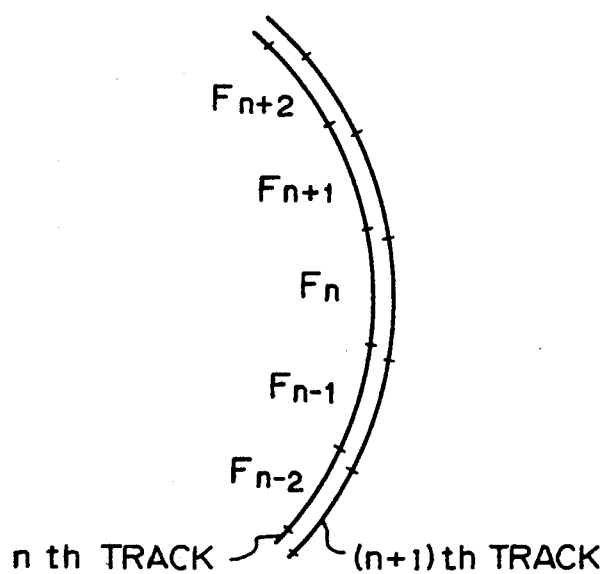
FIG. 3 is a diagram showing the arrangement of the subcoding frame.
Figure 4:
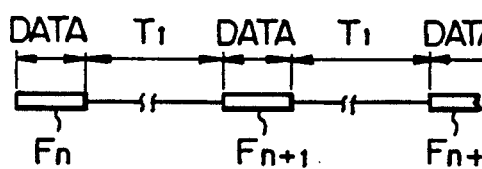
FIG. 4 is a diagram showing an example of the operation of the apparatus shown in FIG. 1.

The above-described sequential operations are repeated until the slow reproduction stop command is issued. Therefore, if the subcoding frames are arranged as illustrated in FIG. 3, the frames $F_n$, $F_{n+1}$, $F_{n+2}$ will be successively supplied to the graphics decoder 22 and the MIDI decoder 23 at intervals $T_1$ as illustrated in FIG. 4. The interval $T_1$ is almost equal to the time period of one revolution of the disc. Since information is recorded on the digital audio disc so that the linear velocity is maintained constant, the interval $T_1$ has a maximum value of about 280 millisecond at the outermost peripheral position, and has a minimum value of about 126 millisecond at the innermost peripheral position. Since the time period required for reading the subcoding frame is 1/75 second, that is, 13.3 millisecond, the interval $T_1$ is 21 times the time period required for the reading of the subcode frame at the outermost peripheral position, and 9.5 times the time period required for the reading of the subcode frame at the inner most peripheral position.

After the subcode constituting one subcoding frame is supplied to the graphics decoder 22 and the MIDI decoder 23 and the subcode is decoded, the next subcode will not be supplied to the graphics decoder 22 and the MIDI decoder before the lapse of a time period corresponding to the interval $T_1$. Therefore, if there is the interval $T_1$ after the "scroll" instruction in the subcode graphics, for example, has been supplied to the decoder, the scroll operation will be executed within the interval $T_1$. This means that the slow reproduction of the subcode is performed equivalently.

On the other hand, in the case that the MIDI signal is recorded as the subcode, there are instructions which are executed successively until the next subcode is supplied to the decoder. Also in this case the slow reproduction is performed in the same manner as the reproduction of the subcode graphics. The electronic musical instruments are played slowly by the MIDI signal in such a case. Accordingly, the disc playing apparatus according to the present invention can be used as a large scale sequential control system with the capability of the slow reproduction.

Figure 5:
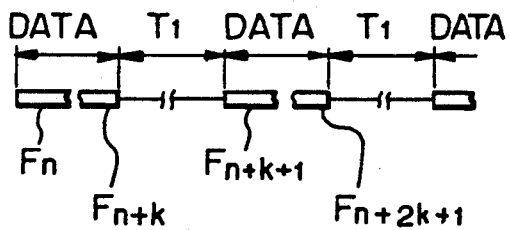

In the above described embodiment, the apparatus is constructed that the subcode of one subcoding frame is continuously supplied to the graphics decoder 22 and the MIDI decoder 23 during a time period between one jump operation to the next jump operation. However, it is also possible to arrange the apparatus such that the subcode of a plurality of subcoding frames are continuously supplied as illustrated in FIG. 5.

Figure 6:
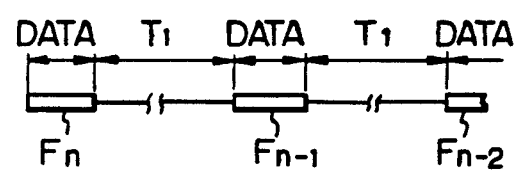
FIGS. 5 through 7 are diagrams showing other examples of the operation of the apparatus shown in FIG. 1.
Figure 7:
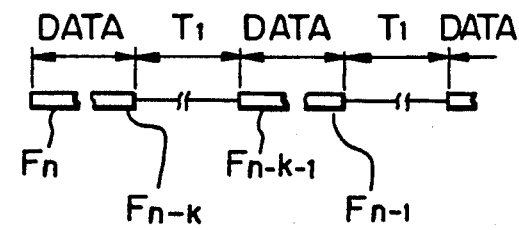
Figure 8:
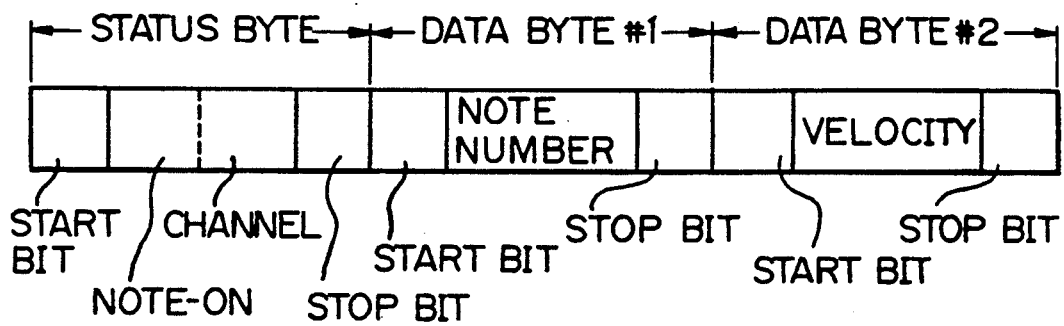
FIG. 8 is a diagram showing an example of the structure of MIDI message.
Figure 9:
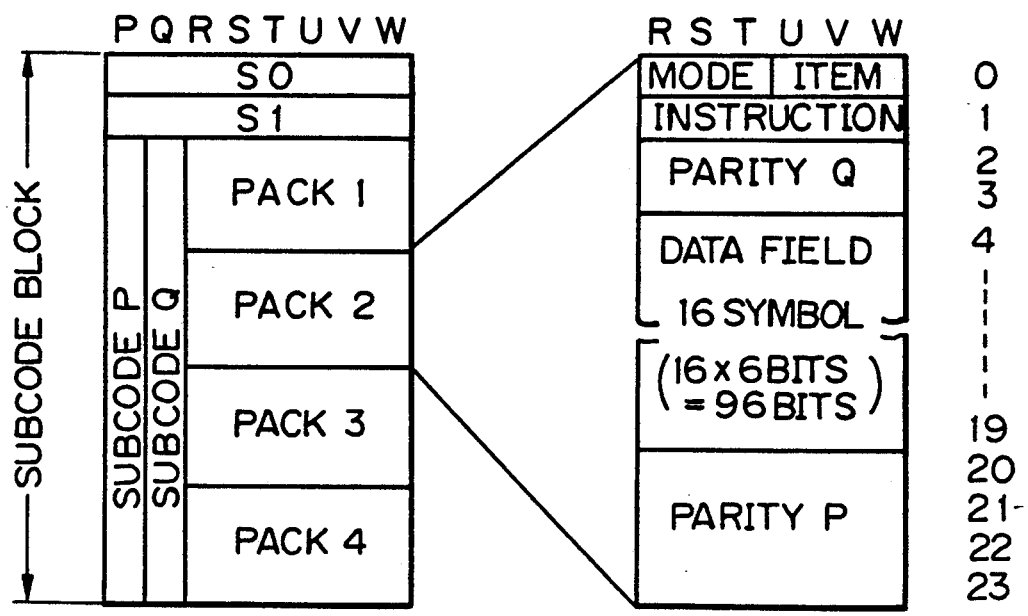
FIG. 9 is a diagram showing an example of the structure of the subcode data.

Furthermore, in the embodiment described above, each subcoding frame is supplied to the graphics decoder and the MIDI decoder in the order of recording. However, it is also possible to arrange the apparatus such that each subcoding frame is supplied to the graphics decoder 22 and the MIDI decoder 23 in an order reverse to the order of writing as illustrated in FIG. 6, by using a value smaller than (L-2) as the reference value to be compared with the read out frame number in step S5 of the flowchart of FIG. 2. With this arrangement, a slow reproduction in the reverse direction can be performed. In this case, it is also possible to arrange that the subcode of a plurality of subcoding frames is continuously supplied to the graphics decoder 22 and the MIDI decoder 23 during the period from one jump operation to the next jump operation, as illustrated in FIG. 7. Moreover, it is also possible to arrange that the same subcoding frame is repeatedly supplied to the graphics decoder 22 and the MIDI decoder 23 an arbitrary determined number of times.

As specifically described in the foregoing, the disc playing apparatus according to the present invention is provided with a repeating means for repeating the subcode which has been read by the reading means to the decoding means in response to the repeating command. Every time the predetermined time period corresponding to the relative position of the information reading point of the reading means in a radial direction of the disc elapses, in response to a command the apparatus issues a jump command for moving the information reading point across M (M is a natural number) tracks in a direction retracing the reading direction. During the time period between issuing of the jump command and issuing of the next jump command, the apparatus detects an N-block period, in which N (N is a natural number) blocks of the subcode are read out by means of a block identification signal obtained from the output signal of the reading means, and the apparatus supplies the repeating command to the repeating means only within the detected N-block period. Therefore, with the disc playing apparatus according to the present invention the subcode can be intermittently supplied to the decoding means, in a block or in a plurality of successive blocks every time. Thus, the slow reproduction can be automatically performed satisfactorily.

What is claimed is:

1. A disc playing apparatus for playing a disc on which a digital information signal divided into blocks is recorded as a subcode together with a block identification signal for identifying the blocks, in addition to a coded information signal, comprising:
   a reading means for reading said coded information signal and said subcode from said disc;
   a decoding means for decoding the subcode and producing an information signal;
   a repeating means for repeating the subcode read out by said reading means to said decoding means in response to a repeat command; and
   a control means for controlling said reading means and said repeating means, wherein said control means generates, in response to a command, a jump command for moving an information reading point of said reading means across M (M is a natural number) tracks in a direction retracing a reading direction every time a predetermined time period corresponding to the relative position of the information reading point in a radial direction of the disc elapses; detects, during a period between issuing of the jump command and issuing of the next jump command, an N-block period, in which N (N is a natural number) blocks of the subcode are read out, by means of a block identification signal obtained from an output signal of the reading means; and supplies a repeating command to the repeating means only during the N-block period.

2. An apparatus as claimed in claim 1, wherein said predetermined time period is shorter than a time period required for said disc to rotate M times by a time period obtained by the summation between a time period required for reading at least N-blocks of the subcode and a time period required for a jump of said information reading point, and wherein N-blocks of said subcode are read out successively in the order of recording every said N-block period.

3. An apparatus as claimed in claim 1, wherein said predetermined time period is shorter than a time period required for said disc to rotate M times by a time period obtained by the summation between a time period required for reading at least 2N-blocks of the subcode and a time period required for a jump of said information reading point, and wherein N-blocks of said subcode are read out successively in an order reverse to the order of recording every said N-block period.

* * * * *